(12) United States Patent
Hayashi et al.

(10) Patent No.: US 7,826,941 B2
(45) Date of Patent: Nov. 2, 2010

(54) MODE CHANGE CONTROL SYSTEM FOR HYBRID VEHCILE

(75) Inventors: Nobuki Hayashi, Zama (JP); Munetoshi Ueno, Atsugi (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 444 days.

(21) Appl. No.: 11/870,018

(22) Filed: Oct. 10, 2007

(65) Prior Publication Data

US 2008/0091314 A1  Apr. 17, 2008

(30) Foreign Application Priority Data

Oct. 12, 2006  (JP)  ............................... 2006-278824
Jul. 31, 2007  (JP)  ............................... 2007-199124

(51) Int. Cl.
*G05D 3/00* (2006.01)

(52) U.S. Cl. .................... 701/22; 180/65.23; 180/65.29; 903/907; 903/947

(58) Field of Classification Search .................... 701/22; 180/65.23, 65.29, 62.29; 903/907, 947
See application file for complete search history.

(56) References Cited

U.S. PATENT DOCUMENTS 6,186,255 B1  2/2001  Shimasaki et al.
6,543,565 B1*  4/2003  Phillips et al. ............... 180/165
6,735,502 B2*  5/2004  Phillips et al. ................ 701/22
2003/0236599 A1  12/2003  Saito et al.
2005/0054480 A1  3/2005  Ortmann et al.
2005/0155803 A1  7/2005  Schiele

FOREIGN PATENT DOCUMENTS

| EP | 1 375 241 A1 | 1/2004 |
| FR | 2 770 808 A1 | 5/1999 |
| FR | 2 793 449 A1 | 11/2000 |
| FR | 1 113 943 B1 | 11/2004 |
| JP | 2004-023959 A | 1/2004 |

* cited by examiner

*Primary Examiner*—Mark Hellner
(74) *Attorney, Agent, or Firm*—Young Basile

(57) ABSTRACT

During vehicle drive under an EV mode, a battery charge state SOC becomes smaller than a SOC(L) at time t0. As a result, EV→HEV mode change is carried out. After time t1, deceleration is desired, and an accelerator opening APO is kept at 0. At time t3, the SOC increases and becomes greater than or equal to a SOC(H) by the HEV mode. In this case, after time t1 of release of an accelerator pedal, the SOC(H) is cleared at time t2 at which a vehicle operating condition is judged to be a low load drive condition in which a motor/generator performs regenerative braking. By making a judgment of HEV→EV mode change based on the SOC(L) instead of the SOC(H), the HEV→EV mode change is carried out before time t3. A regenerative braking time Δt with the engine dragged is therefore shortened, and a regenerative braking time with no-engine drag can be correspondingly lengthened, improving an energy recovery performance.

18 Claims, 13 Drawing Sheets

Δt (TIME OF REGENERATIVE BRAKING WITH ENGINE DRAGGED)

__US 7,826,941 B2__

MODE CHANGE CONTROL SYSTEM FOR HYBRID VEHCILE

CROSS-REFERENCE TO RELATED APPLICATIONS

This application claims priority from Japanese Patent Application Serial No. 2006-278824, filed Oct. 12, 2006, and Japanese Patent Application Serial No. 2007-199124, filed Jul. 31, 2007, each of which is incorporated herein in its entirety by reference.

TECHNICAL FIELD

The invention relates in general to a drive mode change control system of a hybrid vehicle, and more particularly to a mode change control system from a hybrid drive (HEV) mode to an electric drive (EV) mode for a hybrid vehicle having an engine and a motor/generator.

BACKGROUND

In recent years, there have been proposed and developed various types of hybrid drive systems for use of a hybrid vehicle. In any hybrid drive system, on the occasion of the mode change between the electric drive (EV) mode and the hybrid drive (HEV) mode, the mode change control has to be carried out in accordance with not only an operation condition of the vehicle such as a vehicle speed or desired driving force, but also power supply to the motor/generator or state of charge of a battery that is responsible for storing electric power generated by the motor/generator.

For example, in a case where the state of charge of the battery drops to a certain extent due to the drive of the electric drive (EV) mode, in order to prevent a situation in which restoration of the battery becomes impossible by the further drop of the battery charge state, by shifting from the electric drive (EV) mode to the hybrid drive (HEV) mode, the motor/generator is applied with an electrical generating load and the engine drives this load; then the generated electric power is stored in the battery. In a case where the battery charge state exceeds a certain degree during the drive of the hybrid drive (HEV) mode, in order to prevent deterioration of the battery by the further overcharge of the battery, the above overcharge is prevented by shifting from the hybrid drive (HEV) mode to the electric drive (EV) mode.

Accordingly, in a case where a judgment of a desired mode change from the electric drive (EV) mode to the hybrid drive (HEV) mode and a judgment of a desired mode change from the hybrid drive (HEV) mode to the electric drive (EV) mode are carried out based on the same battery charge state set value, a hunting of the control occurs when the battery charge state is around the set value. Therefore, the mode change between the electric drive (EV) mode and the hybrid drive (HEV) mode frequently occurs, and this start and stop of the engine is burdensome and/or complicated.

To solve such problems, as disclosed in Japanese Patent Provisional Publication No. 2004-023959, a relatively low first set battery charge state for changing the mode from the electric drive (EV) mode to the hybrid drive (HEV) mode and a relatively high second set battery charge state for judging the mode change from the hybrid drive (HEV) mode to the electric drive (EV) mode are individually set, and the mode change judgment is made based on these set battery charge states.

A further explanation is made with reference to FIGS. 14A-14C. These show operation time charts of a case where, during the drive of the EV mode, a battery charge state SOC becomes lower than a first set battery charge state SOC(L) at time t0. As a result the change from EV mode to the HEV mode is then carried out. After time t1, an accelerator opening APO is kept at 0 by release of an accelerator pedal with a vehicle speed VSP desired to be lowered as shown in the drawing. By the HEV mode, the battery charge state SOC rises and becomes higher than or equal to a second set battery charge state SOC(H) at time t2. As a result, the change from HEV mode to the EV mode is then carried out.

According to this mode change control, there is a hysteresis area or domain between the first set battery charge state SOC(L) and the second set battery charge state SOC(H). The EV→HEV mode change is not carried out unless the battery charge state SOC becomes lower than the first set battery charge state SOC(L). Conversely, the HEV→EV mode change is not carried out unless the battery charge state SOC becomes higher than or equal to the second set battery charge state SOC(H). Thus, the hunting of the control can be prevented, and the frequent occurrence of the mode change between the electric drive (EV) mode and the hybrid drive (HEV) mode is reduced.

BRIEF SUMMARY

Control systems, controllers and control methods for hybrid vehicle control are taught herein. A hybrid vehicle includes an engine, a motor/generator, a battery operable to provide the motor/generator with electric power and to receive and store electric power regenerated by the motor/generator, a first clutch between the engine and the motor/generator, and at least one driving wheel. One control system taught herein comprises a controller configured to select a drive mode wherein the drive mode comprises at least one of an electric drive mode, in which the first clutch is released and power transmission is made only between the motor/generator and the at least one driving wheel, and a hybrid drive mode, in which the first clutch is engaged and power transmission is made between at least the engine and the motor/generator and the at least one driving wheels. The controller is further configured to decide to make a mode change from the electric drive mode to the hybrid drive mode when a battery charge state of the battery becomes lower than a first set battery charge state, determine to male a mode change from the hybrid drive mode to the electric drive mode when the battery charge state becomes higher than or equal to a second set battery charge state, wherein an initial value of the second set battery charge state is higher than the first set battery charge state and change the second set battery charge state to a lower value than the initial value when a vehicle driving condition is judged to be a low load drive condition in which a regenerative braking is carried out under the battery charge state where the hybrid drive mode is selected such that the mode change to the electric drive mode from the hybrid drive mode is permitted.

One controller for such a hybrid vehicle comprises means for selecting a drive mode wherein the drive mode comprises at least one of an electric drive mode, in which the first clutch is released and power transmission is made only between the motor/generator and the at least one driving wheel, and a hybrid drive mode, in which the first clutch is engaged and power transmission is made between at least the engine and the motor/generator and the at least one driving wheels, means for deciding to make a mode change from the electric drive mode to the hybrid drive mode when a battery charge state of the battery becomes lower than a first set battery charge state, means for deciding to make a mode change from the hybrid drive mode to the electric drive mode when the battery charge state becomes higher than or equal to a second set battery charge state, wherein an initial value of the second set battery charge state is higher than the first set battery charge state and means for changing the second set battery charge state to a lower value than the initial value when a vehicle driving condition is judged to be a low load drive condition in which a regenerative braking is carried out under the battery charge state where the hybrid drive mode is selected such that the mode change to the electric drive mode from the hybrid drive mode is permitted.

An example of a method taught herein for such a hybrid vehicle comprises selecting a drive mode wherein the drive mode comprises at least one of an electric drive mode, in which the first clutch is released and power transmission is made only between the motor/generator and the at least one driving wheel, and a hybrid drive mode, in which the first clutch is engaged and power transmission is made between at least the engine and the motor/generator and the at least one driving wheels, deciding to make a mode change from the electric drive mode to the hybrid drive mode when a battery charge state of the battery becomes lower than a first set battery charge state, deciding to make a mode change from the hybrid drive mode to the electric drive mode when the battery charge state becomes higher than or equal to a second set battery charge state, wherein an initial value of the second set battery charge state is higher than the first set battery charge state and changing the second set battery charge state to a lower value than the initial value when a vehicle driving condition is judged to be a low load drive condition in which a regenerative braking is carried out under the battery charge state where the hybrid drive mode is selected such that the mode change to the electric drive mode from the hybrid drive mode is permitted.

BRIEF DESCRIPTION OF DRAWINGS

The description herein makes reference to the accompanying drawings wherein like reference numerals refer to like parts throughout the several views, and wherein.

DETAILED DESCRIPTION OF EMBODIMENTS OF THE INVENTION

Figure 1:
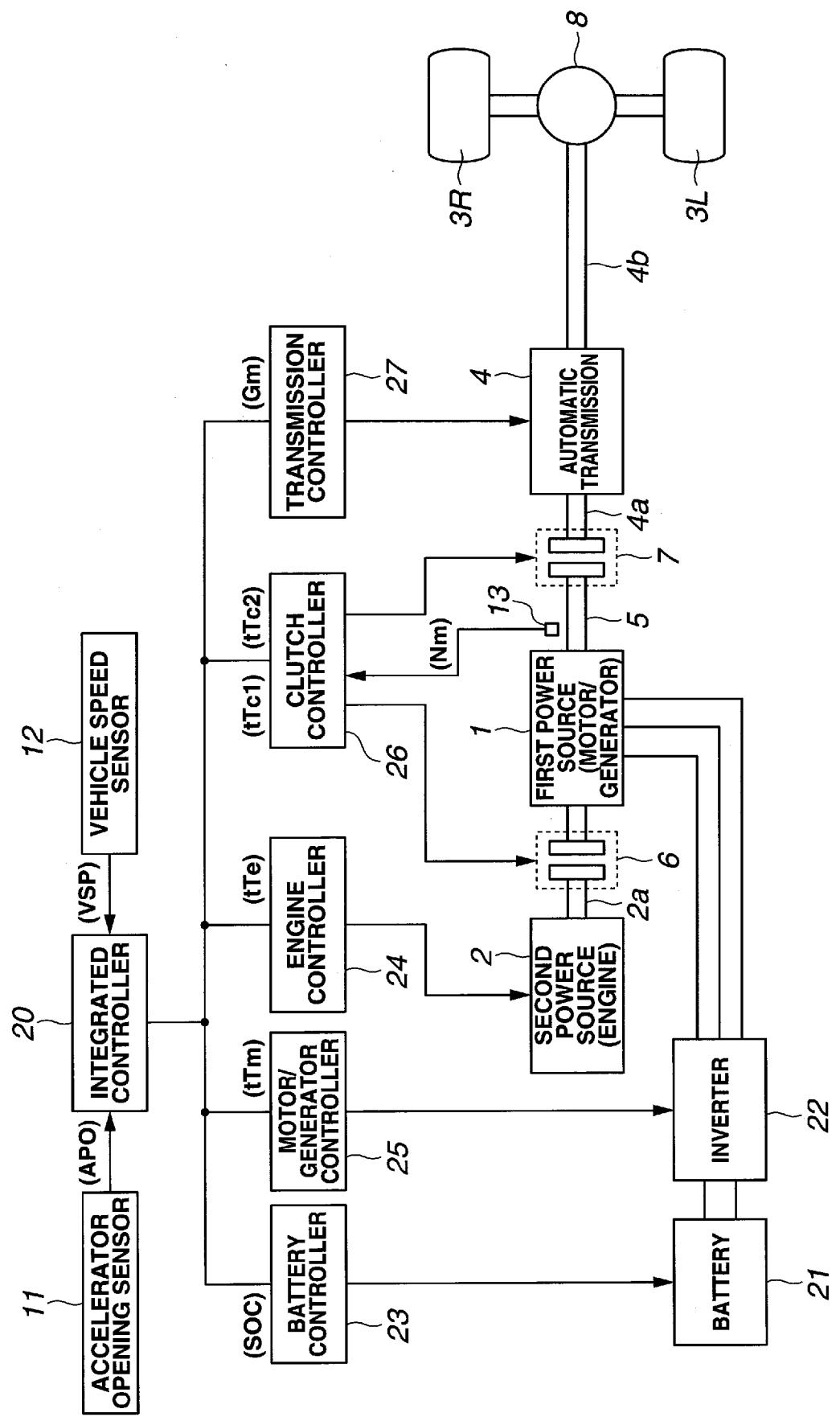
FIG. 1 is a diagram of a power train of a hybrid vehicle that has a mode change control system according to an embodiment of the invention.

According to Japanese Patent Provisional Publication No. 2004-023959 discussed previously, by the set of the hysteresis, the battery charge state SOC becomes lower than the first set battery charge state SOC(L). Further, once the mode is change from the EV drive mode to the HEV drive mode (at time t0), a return from the HEV drive mode to the EV drive mode is forbidden until time t2 at which the battery charge state SOC becomes higher than or equal to the second set battery charge state SOC(H). The following problems, therefore, arise.

The vehicle coasts after the release of the accelerator pedal (t1), thus the motor/generator applies a braking force to the vehicle by regenerative braking while generating the electric power. And the generated electric power obtained by this regenerative braking is stored in the battery to use for next motor drive.

If the mode is the EV drive mode, the regenerative braking by the motor/generator is carried out without dragging the engine since the engine is separated from the motor/generator by release of the first clutch disposed between the engine and the motor/generator. However, in the case of the HEV drive mode, the regenerative braking by the motor/generator is carried out under a condition where the engine is connected to the motor/generator by engagement of the first clutch, that is, the regenerative braking takes place is carried out with dragging the engine. And then a regenerative braking energy is lowered by a energy of the engine drag. Thus, energy recovery performance deteriorates, and improvements in fuel economy are restrained.

This point is explained with reference to the operation time charts in FIGS. 14A-14C. A HEV mode coasting drive time Δt from the time t1 of the release of the accelerator pedal to the time t2 of HEV→EV mode change corresponds to a time of the regenerative braking with the engine dragged. By the set of the hysteresis, this HEV mode coasting drive time Δt lengthens. Energy recovery performance deteriorates, and the effect of improvements to fuel economy is reduced.

In contrast, embodiments of the invention taught herein provide a mode change control system of a hybrid vehicle that maximizes the energy recovery performance (and minimizes a reduction of the fuel economy improvement effect) by permitting a selection of the EV drive mode even in the case of the battery charge state that selects the HEV drive mode under the conditions where the above problems arise.

With the mode change control system taught herein, the selection of the electric drive mode is permitted even in the case of the battery charge state where the hybrid drive mode has to be selected under a low load drive condition of the vehicle where the motor/generator carries out regenerative braking. Accordingly, a time for which the motor/generator carries out regenerative braking in the hybrid drive mode is shortened, and a time for which the motor/generator carries out regenerative braking in the electric drive mode is lengthened by the permission of the selection of the electric drive mode. Since the time for which regenerative braking by the motor/generator is carried out with dragging the engine is shortened, deterioration in the energy recovery performance and a reduction of the fuel economy improvement effect are minimized.

Hereinafter, certain embodiments of the invention are described in detail with reference to the drawings. FIG. 1 shows a diagram of a driveline (a power train) of a hybrid vehicle that has a mode change control system according to an embodiment of the invention. A motor/generator 1 is a first power source, while an engine 2 is a second power source. These power sources supply driving power to left 3L and right 3R driving wheels (left and right rear wheels in this example).

In the power train of the hybrid vehicle shown in FIG. 1, an automatic transmission 4 is placed back from the engine 2 in front and rear directions of the vehicle in tandem, same as a normal rear wheel drive vehicle. The motor/generator 1 is connected with a shaft 5 that transmits a rotation from the engine 2 (from an engine crankshaft 2a) to an input shaft 4a of the automatic transmission 4.

The motor/generator 1 is an alternating current synchronous motor placed between the engine 2 and the automatic transmission 4. When driving the wheels 3L and 3R, the motor/generator 1 acts as a motor, and when the regenerative braking of the wheels 3L and 3k is carried out, the motor/generator 1 acts as a generator. Between this motor/generator 1 and the engine 2, in more detail, between the shaft 5 and the engine crankshaft 2a, a first clutch 6 is disposed. This first clutch 6 connects the engine 2 and the motor/generator 1 such that the engine 2 and the motor/generator 1 can separate.

Here, the first clutch 6 is can be a dry clutch that is capable of varying a transmission torque capacity continuously or gradually or step by step. For example, one possible clutch is a clutch that is capable of varying the transmission torque capacity by continuously controlling a clutch engaging force with an electromagnetic solenoid.

Between the motor/generator 1 and the automatic transmission 4, more particularly, between the shaft 5 and the transmission input shaft 4a, a second clutch 7 is disposed. This second clutch 7 connects the motor/generator 1 and the automatic transmission 4 such that the motor/generator 1 and the automatic transmission 4 can separate. The second clutch 7 is also a clutch that is capable of varying the transmission torque capacity continuously or gradually or step by step, same as the first clutch 6. In this example, the second clutch 7 is formed by a wet multiple disc clutch that is capable of varying the transmission torque capacity by continuously controlling a quantity of a clutch fluid flow and/or a clutch fluid pressure with a proportional solenoid.

The automatic transmission 4 selectively engages or releases a plurality of shift frictional elements (clutch and brake etc.), and determines a drive line (a speed stage) by a combination of these engagements and releases. Thus, the automatic transmission 4 changes the rotation from the transmission input shaft 4a with a transmission ratio according to a selected speed stage, and outputs the rotation to an output shaft 4b. This output rotation is separately transmitted to the left and right rear wheels 3L and 3R through a final speed reducer 8 including a differential gear device for the drive of the vehicle. However, the automatic transmission 4 is not limited to a multi-stage transmission, it can be a continuously variable transmission.

In the above power train of the hybrid vehicle shown in FIG. 1, where an electric drive (EV) mode used in a low load/low vehicle speed condition is required, such as during a start of the vehicle from a stop state, the first clutch 6 is released and the second clutch 7 is engaged. Thusly the automatic transmission 4 is in a power transmission state. When driving the motor/generator 1 in this condition, only the output rotation from the motor/generator 1 is transmitted to the transmission input shaft 4a. The automatic transmission 4 changes the rotation of the input shaft 4a according to the selected speed stage and outputs it through the transmission output shaft 4b. Afterwards, the rotation from the transmission output shaft 4b is transmitted to the left and right rear wheels 3L and 3R through the final speed reducer 8 including the differential gear device, and it becomes possible to drive the vehicle by way of the electric drive (EV) by only the motor/generator 1. Further, if the vehicle is coasting, by a rotation from the left and right rear wheels 3L and 3R, only the motor/generator 1 is driven and rotated without driving and rotating the engine 2.

Where a hybrid drive (HEV) mode is required in a high speed drive condition, a large load drive condition, or a low battery charge state SOC (a low usable electric power) condition, the first clutch 6 is engaged. A torque of the motor/generator 1 is transmitted to the engine 2, thereby starting the engine 2. The first and second clutches 6 and 7 are in an engaged condition, and the automatic transmission 4 is in the power transmission state. In this condition, the output rotation from the engine 2, or from both the engine 2 and the motor/generator 1, is transmitted to the transmission input shaft 4a. The automatic transmission 4 changes the rotation of the input shaft 4a according to the selected speed stage and outputs it through the transmission output shaft 4b.

The HEV drive mode in which only the output rotation from the engine 2 is transmitted to the transmission input shaft 4a is called an engine drive mode. In this mode, the motor/generator 1 idles or turns free. The HEV drive mode in which the output rotation from both the engine 2 and the motor/generator 1 is transmitted to the transmission input shaft 4a is called a motor-assist drive mode. In this mode, the engine output is assisted by the motor torque in order to improve the fuel economy effect.

In any event, the rotation from the transmission output shaft 4b, changed by the automatic transmission 4, is transmitted to the left and right rear wheels 3L and 3R through the final speed reducer 8. It thus becomes possible to drive the vehicle by way of the hybrid drive (HEV) by the power of at least the engine 2. Further, if the vehicle is coasting, by a rotation from the left and right rear wheels 3L and 3R, both of the engine 2 and the motor/generator 1 are driven and rotated.

During the HEV drive mode, where there is a surplus of an energy when the engine 2 is driven under an optimum fuel efficiency condition, the motor/generator 1 works as the generator by this surplus energy. This surplus energy is thus transformed into electric power Then, by storing this generated electric power to use for the motor drive of the motor/generator 1, the fuel economy of the engine 2 can be improved. This HEV drive mode is called a drive-power-generation mode. In this mode, the engine 2 drives the driving wheels 3L and 3R as the power source, and the motor/generator 1 is also driven by this engine power against the load of the power generation.

In FIG. 1, the second clutch 7 is inserted between the motor/generator 1 and the automatic transmission 4 to separably connect the motor/generator 1 and the driving wheels 3L and 3R. However, the second clutch 7 can be inserted between the automatic transmission 4 and the final speed reducer 8. Alternatively, the shift frictional element for selecting the speed stage inside the automatic transmission 4 might be used as the second clutch 7 to perform the functions of the second clutch 7. In addition, as shown in FIG. 1, although the power train is configured such that the EV drive mode and the HEV drive mode are selected by the first and second clutches 6 and 7 placed to the front and rear of the motor/generator 1, the configuration is not limited to this. The inventive control taught herein can be applied to any power train as long as a hybrid drive mode by the power of at least the engine and an electric drive mode by the power of the motor/generator can be selected.

In FIG. 1, the control system for the power train of the hybrid vehicle, that is, the engine 2, the motor/generator 1, the first clutch 6, the second clutch 7 and the automatic transmission 4, is shown. The control system in FIG. 1 has an integrated controller 20 that controls an operating point of the power train. The integrated controller 20 and other controllers discussed hereinafter can each be, for example, a microcomputer including a random access memory (RAM), a read-only memory (ROM) and a central processing unit (CPU) in addition to various input and output connections. Generally the functions described herein for the integrated controller 20 and other controllers are respectively performed by execution by the CPU of one or more programs stored in ROM. The parts of the controllers shown in the figures and described below represent functional components of the one or more programs. Of course, some or all of the functions described can also be implemented in whole or in part by hardware. Also, although each of the controllers is separately illustrated, separate controllers are not necessary as the functions can be combined into one or more devices.

The operating point of the power train is defined by an engine torque target value tTe, a motor/generator torque target value tTm, a transmission torque capacity target value tTc1 of the first clutch 6, a target transmission torque capacity tTc2 of the second clutch 7 and a target speed stage Gm of the automatic transmission 4. A signal that detects an accelerator opening APO output from an accelerator opening sensor 11 and a signal that detects a vehicle speed VSP output from a vehicle speed sensor 12 are inputt to the integrated controller 20 so as to determined the operating point of the power train.

As shown, the drive of the motor/generator 1 is controlled by the power from a battery 21 through an inverter 22. However, when the motor/generator 1 acts as the generator as previously described, the electric power generated by the motor/generator 1 is stored in the battery 21. During this time, the charge state of the battery 21 is controlled by a battery controller 23 in order to prevent an overcharge of the battery 21. For this battery charge state control, the battery controller 23 detects the battery state of charge, or charge state, SOC (usable electric power) of the battery 21 and provides information concerning this battery charge state to the integrated controller 20.

The integrated controller 20 selects the drive mode (either the EV drive mode or the HEV drive mode) that can realize the driving force of the vehicle desired by the driver based on the accelerator opening APO, the battery charge state SOC and the vehicle speed VSP. The integrated controller 20 also calculates the engine torque target value tTe, the motor/generator torque target value tTm, the first clutch transmission torque capacity target value tTc1, the second clutch transmission torque capacity target value tTc2 and the target speed stage Gm of the automatic transmission 4. The engine torque target value tTe is provided to an engine controller 24, and the motor/generator torque target value tTm is provided to a motor/generator controller 25.

The engine controller 24 controls the engine 2 so that an engine torque Te becomes the engine torque target value tTe. Similarly, the motor/generator controller 25 controls the motor/generator 1 by the power of the battery 21 through the inverter 22 so that a torque Tm of the motor/generator 1 becomes the motor/generator torque target value tTm.

The integrated controller 20 provided the first clutch transmission torque capacity target value tTc1 and the second clutch transmission torque capacity target value tTc2 to a clutch controller 26, The clutch controller 26 provides a solenoid current corresponding to the first clutch transmission torque capacity target value tTc1 to an electromagnetic force control solenoid (not shown) of the first clutch 6 and controls the engagement of the first clutch 6 so that a transmission torque capacity Tc1 of the first clutch 6 becomes or matches with the first clutch transmission torque capacity target value tTc1.

On the other hand, the clutch controller 26 provides a solenoid current corresponding to the second clutch transmission torque capacity target value tTc2 to a fluid pressure control solenoid (not shown) of the second clutch 7 and controls the engagement of the second clutch 7 so that a transmission torque capacity Tc2 of the second clutch 7 becomes or matches with the second clutch transmission torque capacity target value tTc2.

The target speed stage (target transmission ratio) Gm determined by the integrated controller 20 is input to a transmission controller 27. The transmission controller 27 then performs a shift control of the automatic transmission 4 so that the target speed stage (target transmission ratio) Gm is selected.

Figure 2:
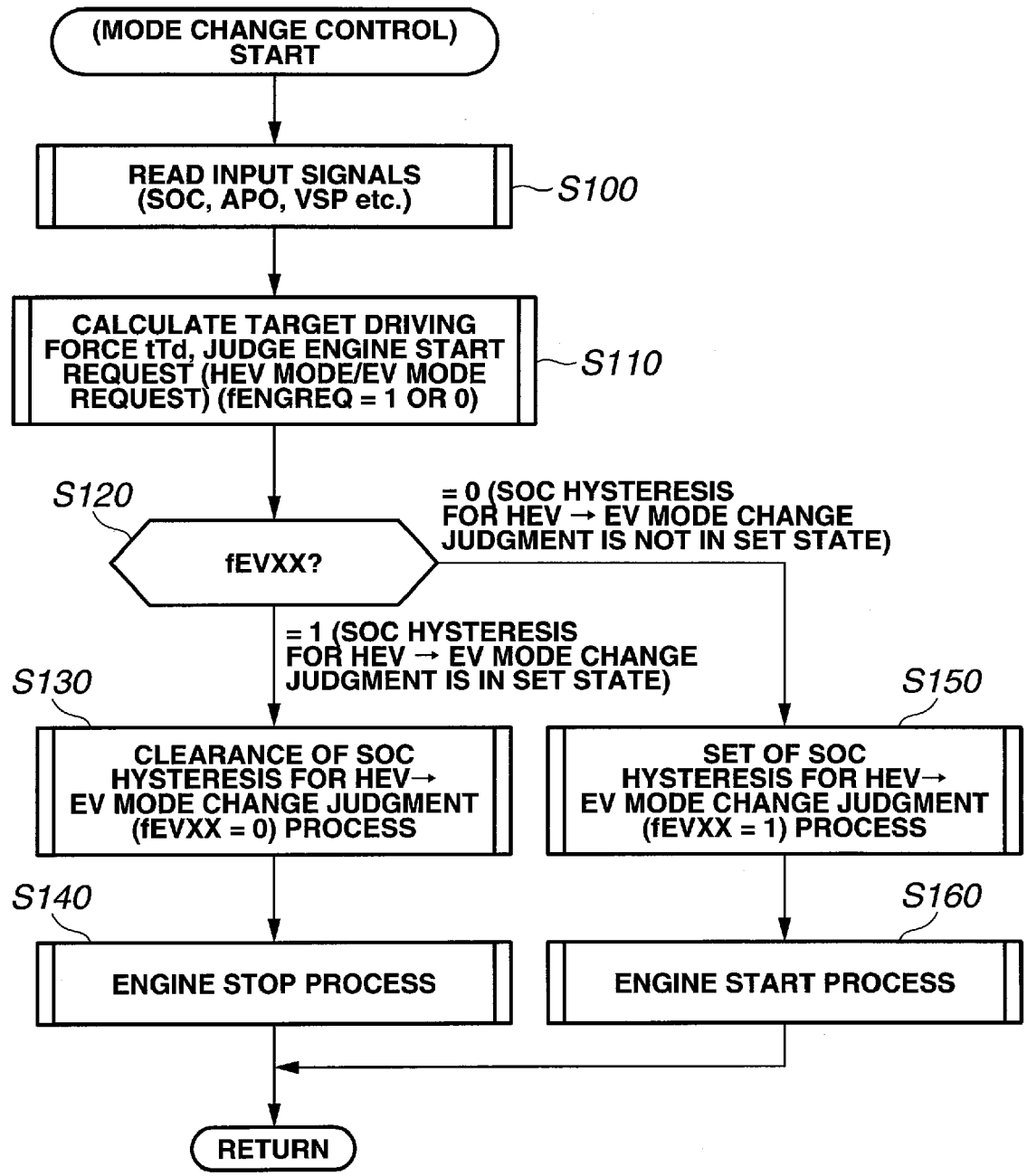
FIG. 2 is a flow chart showing a control program of the mode change control executed by a controller according to FIG. 1.
Figure 3:
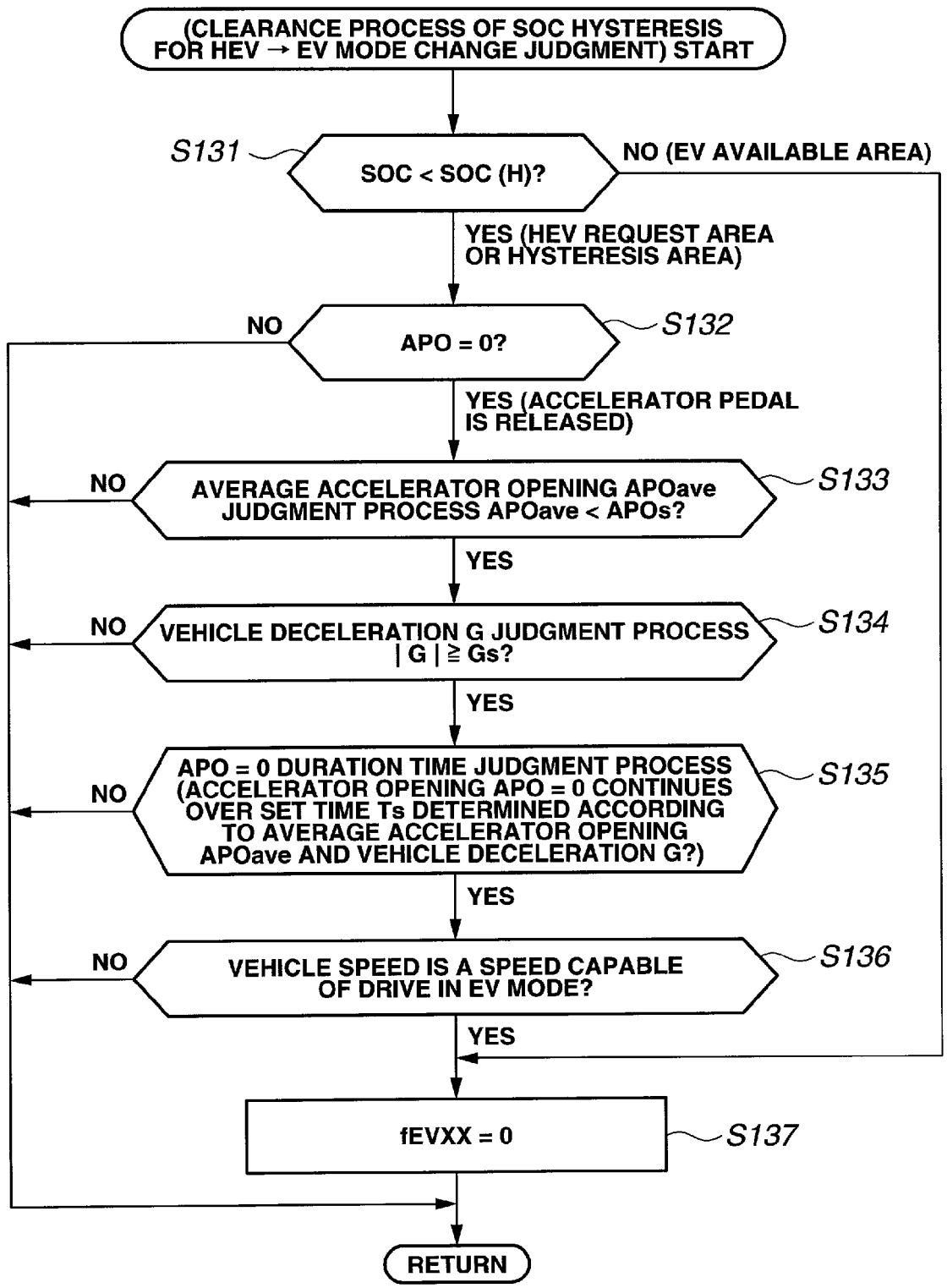
FIG. 3 is a flow chart showing a control program concerning a clearing process of hysteresis for a HEV→EV judgment SOC in FIG. 2.
Figure 4:
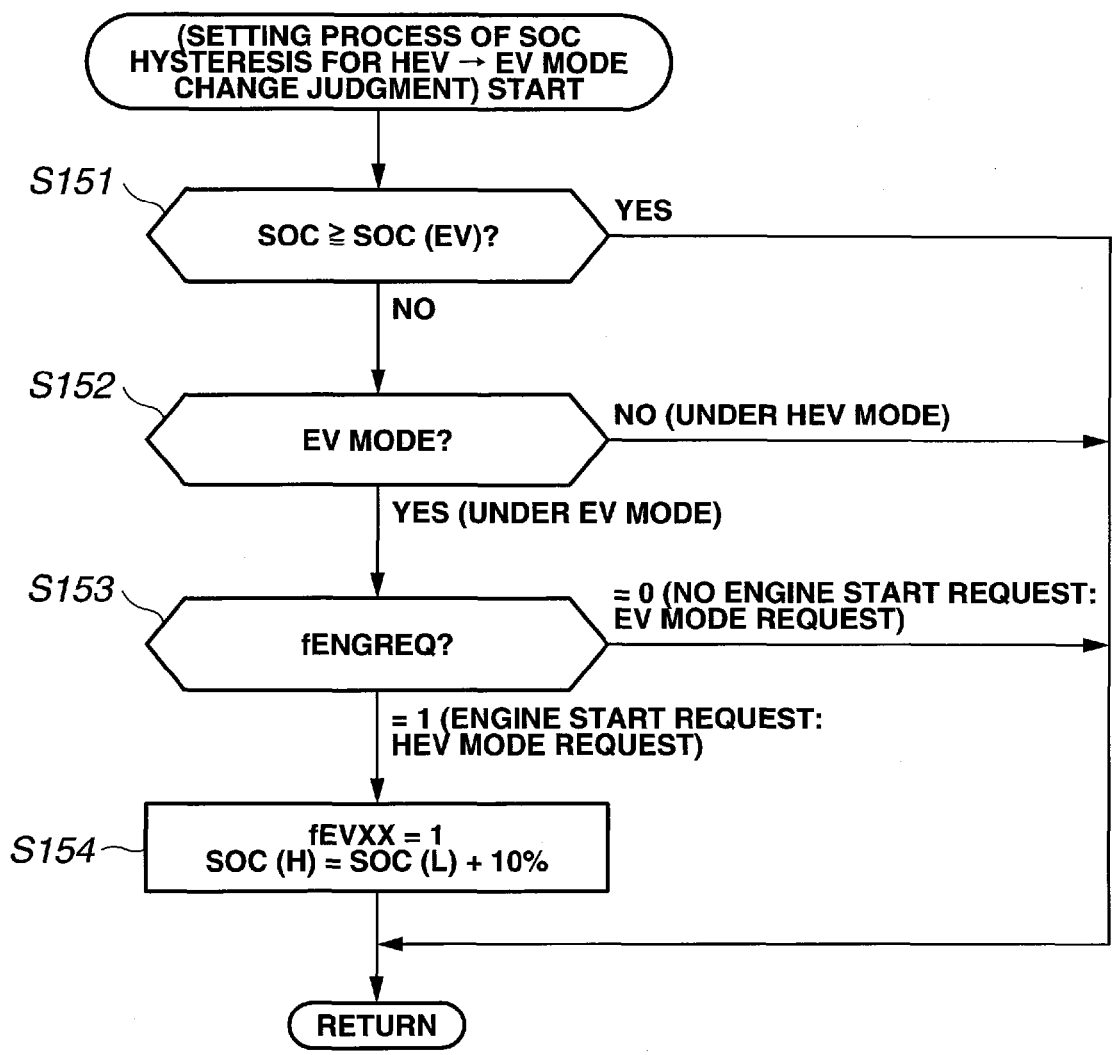
FIG. 4 is a flow chart showing a control program concerning a setting process of hysteresis for a HEV→EV judgment SOC in FIG. 2.
Figure 5:
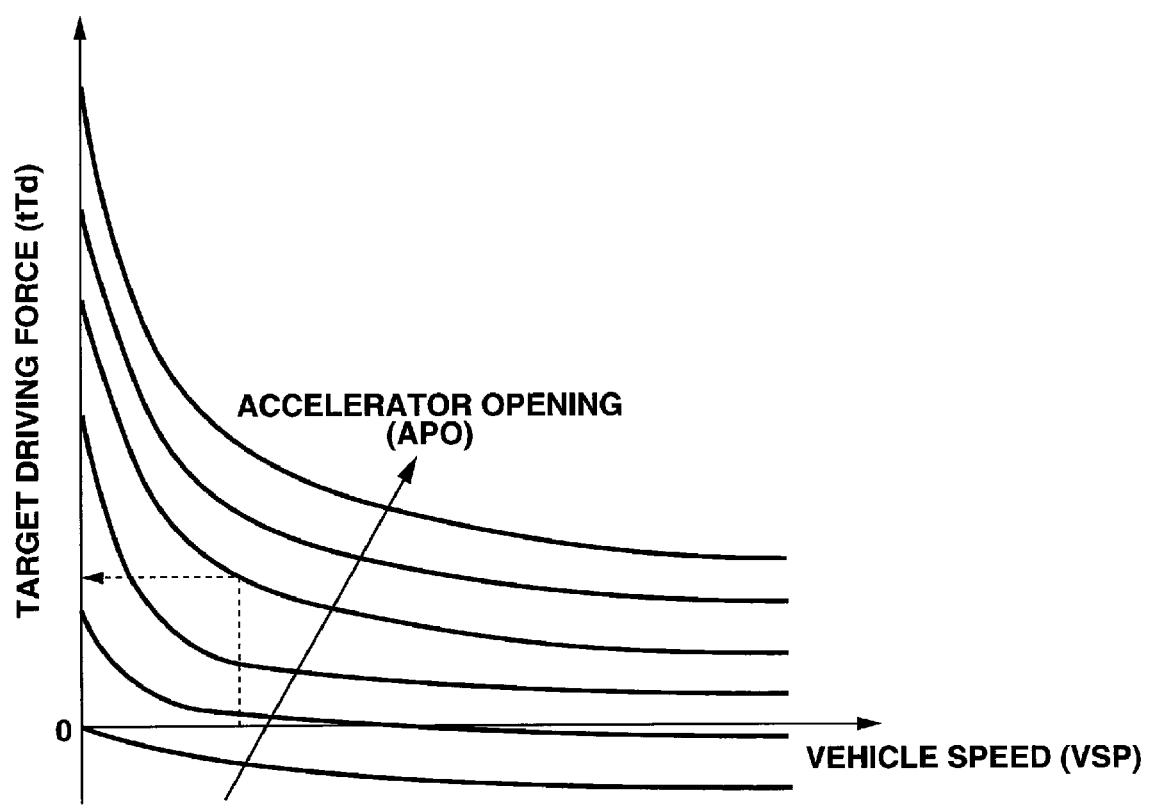
FIG. 5 is a map that can be used when determining a target driving force.

The integrated controller 20 executes control programs of FIGS. 2-4 and performs mode change control between the EV drive mode and the HEV drive mode. FIG. 2 is a main routine of the mode change control. At step S100, input signals such as the battery charge state SOC, the accelerator opening APO, and the vehicle speed VSP, etc., are read. At next step S110, a target driving force tTd for the wheels is retrieved from the accelerator opening APO and the vehicle speed VSP based on a predetermined target driving force (torque) characteristic map shown, as an example, in FIG. 5.

Further, at step S110, a judgment is made as to whether the target driving force tTd can be generated in the EV drive mode or cannot be generated except in the HEV drive mode. If EV drive mode is sufficient, an engine start request flag fENGREQ is set to 0 as a no-engine start request. If the HEV drive mode is required, the engine start is judged to be necessary, and the engine start request flag fENGREQ is set to 1.

Figure 6:
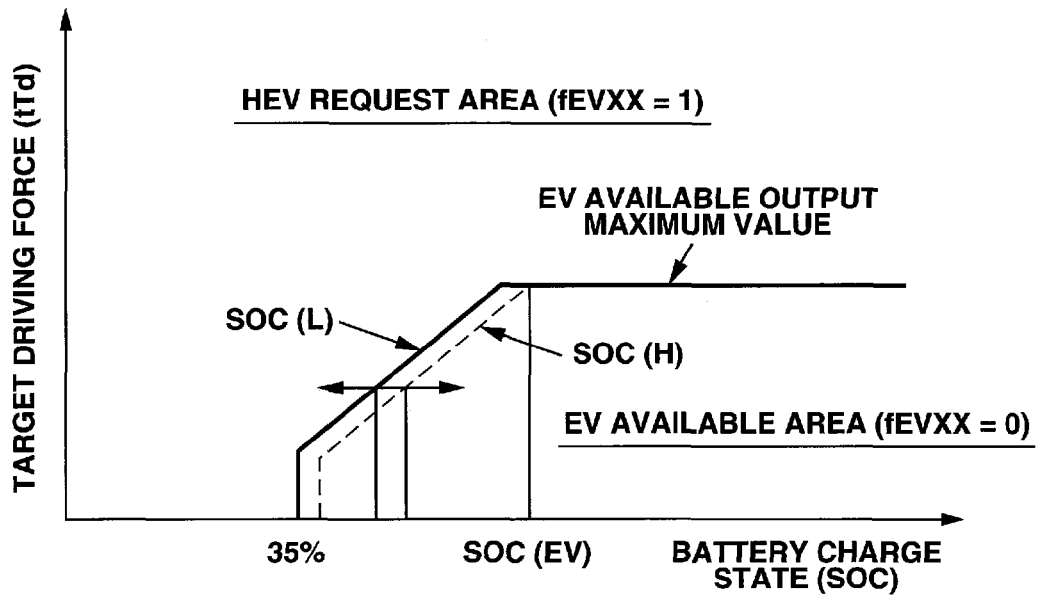
FIG. 6 is a characteristic line showing an available output maximum value in the EV mode that can be used for judging whether the target driving force is a value of an EV mode-capable area or a value of a HEV mode-request area (a first set battery charge state used for judging of EV→HEV mode change), and also showing a second set battery charge state used for judging of HEV→EV mode change.

When judging what setting to provide to engine start request flag fENGREQ, an EV mode available output maximum value for the battery charge state SOC (charge rate or ratio with respect to the full charge state) shown, as an example, by a solid line in FIG. 6, is compared with the target driving force tTd. A judgment is made as to whether a current target driving force tTd is smaller than or equal to the EV mode available output maximum value corresponding to a current battery charge state SOC (that is, the value is in an EV available area) or greater than this EV mode available output maximum value (that is, the value is in a HEV request area).

If the target driving force tTd is less than or equal to the EV mode available output maximum value, the engine start request flag fENGREQ is set to 0 since the target driving force tTd can be generated in the EV drive mode without an engine start request. If the target driving force tTd is greater than the EV mode available output maximum value, the engine start request flag fENGREQ is set to 1 since the target driving force tTd can not be generated in the EV drive mode, and an engine start needs to be requested.

Briefly, as a detailed explanation is included hereinafter, a variation characteristic line of the EV mode available output maximum value, shown by example as the solid line in FIG. 6, is basically a first set battery charge state SOC(L) that is used for the judgment of the EV→HEV mode change. Further, as shown by a broken line in FIG. 6, a second set battery charge state SOC(H) that is greater than this SOC(L) by an amount of a constant hysteresis (for instance 10%) is properly set, and this SOC(H) is used for the judgment of the HEV→EV mode change. However, the second set battery charge state SOC(H) used for the judgment of the HEV→EV mode change is not constant. As described hereinafter, it properly disappears or is eliminated. At a time of this elimination of the SOC(H), the judgment of the HEV→EV mode change is carried out based on the first set battery charge state SOC(L) instead of the second set battery charge state SOC(H).

Returning now to FIG. 2, at next step S120 a flag fEVXX is checked. As described hereinafter, when the second set battery charge state SOC(H) is used for the judgment of the HEV→EV mode change, more specifically, when the SOC hysteresis for the HEV→EV mode change judgment is set between the first set battery charge state SOC(L) and the second set battery charge state SOC(H), the flag fEVXX is set to 1. Conversely, when the SOC hysteresis for the HEV→EV mode change judgment is not set, the flag fEVXX is set to 0. At step S120, if the flag fEVXX=1, the routine proceeds to steps S130 and S140.

At step S130 the control program shown in FIG. 3 is executed. If the request for clearance (or elimination) of the SOC hysteresis for the HEV→EM mode change judgment (i.e., a state where the SOC hysteresis is not set), a process that sets the flag fEVXX to 0 is performed.

With respect to this process of FIG. 3, firstly, at step S131 a check is made to determine whether or not the battery charge state SOC is smaller than the second set battery charge state SOC(H). As can be seen in FIG. 6, SOC<SOC(H) indicates the HEV request area or a hysteresis area between the SOC(L) and the SOC(H). SOC≧SOC(H) indicates the EV available area.

In a case where SOC<SOC(H) at step S131, the routine proceeds to check whether or not the vehicle operating condition is the low load drive condition in which the motor/generator 1 performs the regenerative braking. With respect to this check, a judgment is first made as to whether or not the accelerator opening APO is 0 (indicating that the accelerator pedal is released) at step S132. At step S133 a judgment is made as to whether or not an average accelerator opening APOave for a predetermined period from a time of the accelerator opening APO=0 is smaller than a minute or infinitesimal set opening APOs. At step S134 a judgment is made as to whether or not an absolute value of a vehicle deceleration G during the above-described predetermined period is greater than or equal to a set deceleration Gs for a coasting drive judgment. At step S135 a judgment is made as to whether or not the drive condition in which the accelerator opening APO is 0 has continued over a set time Ts that is determined according to the average accelerator opening APOave and the vehicle deceleration G.

Figure 7:
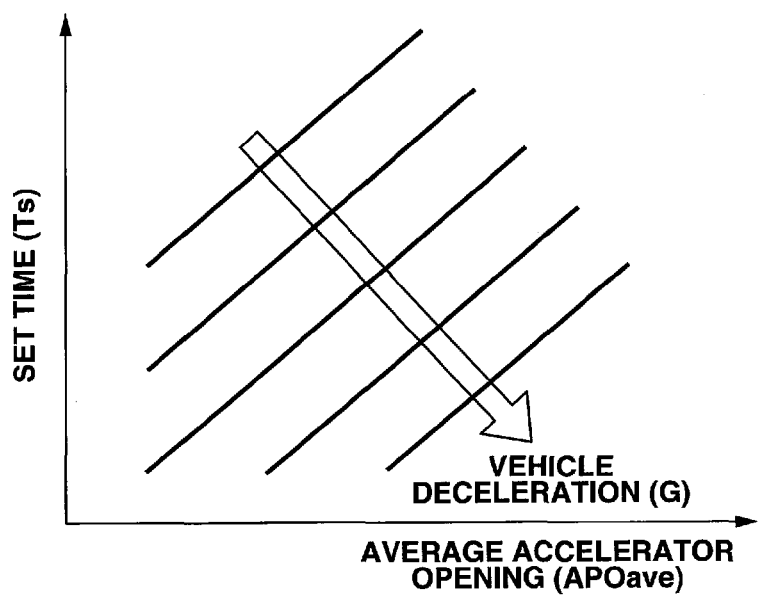
FIG. 7 is a characteristic line showing characteristics of change of a set time for judgment of a low load drive concerning a duration of an accelerator opening.

As shown by example in FIG. 7, the set time Ts is set so that as the average accelerator opening APOave is greater, the set time Ts is longer Further, as the absolute value of the vehicle deceleration G is greater, the set time Ts is shorter.

Returning now to FIG. 3, if the accelerator opening APO is judged to be 0 at step S132, the average accelerator opening APOave is judged to be smaller than the minute set opening APOs at step S133, the absolute value of the vehicle deceleration G is judged to be greater than or equal to the set deceleration Gs at step S134, and the drive condition in which the accelerator opening APO is 0 is judged to have continued over the set time Ts at step S135, then the vehicle operating condition is recognized to be a low load drive condition in which the motor/generator 1 performs regenerative braking. Then, at step S136 a check is made to determine whether or not the current vehicle speed is a speed capable of the drive in the EV mode. If the current vehicle speed is a speed at which the drive in the EV mode is possible, at step S137 the above flag fEVXX is changed from 1 (the state where the SOC hysteresis for the HEV→EV mode change judgment is set) to 0 (the state where the SOC hysteresis for the HEV →EV mode change judgment is not set).

At this time, the second set battery charge state SOC(H) shown by example as the broken line in FIG. 6 is cleared, and the hysteresis area between the first set battery charge state SOC(L) shown by the solid line and the SOC(H) disappears or is cleared. The judgment of the HEV→EV mode change is then carried out based on the first set battery charge state SOC(L) instead of the second set battery charge state SOC(H).

Alternatively, in a case where SOC≦SOC(H) at step S131, the judgment of the HEV→EV mode change is not made because of the EV available area. Thus, the control bypasses steps S132-136, and the routine proceeds from step S131 to step S137. There, to set the flag fEVXX to 0 (that is, the state where the SOC hysteresis for the HEV→EV mode change judgment is not set), the second set battery charge state SOC(H) is cleared.

In addition, where the accelerator opening APO is not 0 (indicating the accelerator pedal is depressed) at step S132, or the average accelerator opening APOave is greater than or equal to the minute set opening APOs at step S133, or the absolute value of the vehicle deceleration G is smaller than the set deceleration Gs at step S134, or the drive condition in which the accelerator opening APO is 0 is not judged to have continued over the set time Ts in step S135, the vehicle operating condition is not the low load drive condition in which the motor/generator 1 performs regenerative braking. The control is terminated as it is, and the flag fEVXX is unchanged from 1 (that is, the state where the SOC hysteresis for the HEV→EV mode change judgment is set). Also, in a case where the current vehicle speed is judged not to be a speed at which the drive in the EV mode is possible at step S136, the control is terminated as it is. The flag fEVXX is kept at 1.

After the above clearance process of the SOC hysteresis for the HEV→EV mode change judgment in FIG. 3 based on step S130 in FIG. 2, the routine returns to step S140 in FIG. 2. At step S140, a judgment is made as to whether or not the HEV→EV mode change has to be carried out according to whether the battery charge state SOC becomes greater than or equal to the first set battery charge state SOC(L) that substitutes for the cleared second set battery charge state SOC(H). If the HEV→EV mode change has to be carried out, the engine 2 is stopped and the first clutch 6 is released at step S140 in order to execute this HEV→EV mode change.

Returning to step S120 in FIG. 2, where the flag fEVXX=0 (that is, the SOC hysteresis for the HEV→EV mode change judgment is not set), the routine proceeds to steps S150 and S160. At step S150, the control program shown in FIG. 4 is executed. If the request for setting the SOC hysteresis for the HEV→EV mode change judgment arises, a process that sets the flag fEVXX to 1 is performed.

With respect to this process, firstly, at step S151 in FIG. 4 a check is made to determine whether or not the battery charge state SOC is greater than or equal to an upper limit SOC(EV) of the second set battery charge state SOC(R). As shown by example in FIG. 6, SOC≧SOC(EV) is not an area that sets the second set battery charge state SOC(H). Thus, the control is terminated as it is, and the current flag fEVXX=0 is kept. Accordingly, the state where the second set battery charge state SOC(H) is cleared is maintained.

Returning now to FIG. 4, at step S151, SOC<SOC(EV) is an area that sets the second set battery charge state SOC(R) as can be seen in FIG. 6. Thus, at steps S152 and S153 a check is made to determine whether or not the second set battery charge state SOC(H) is to be set.

At step S152 a check is made to determine whether the current mode is the EV drive mode or not. At step S153 a check is made to determine whether the engine start request flag fENGREQ at step S110 in FIG. 2 is 1 (indicating the engine start is requested by the HEV mode request) or 0 (indicating the engine start is not requested by the EV mode request).

When the current mode is the EV drive mode at step S152 and the flag fENGREQ is 1 at step S153, that is, when judging that the request for the mode change from the EV drive mode to the HEV drive mode arises, the flag fEVXX is set to 1 (that is, the SOC hysteresis for the HEV→EV mode change judgment is set) at step S154 in preparation for next judgment of the HEV→EV mode change. Also in step S154, the value formed by adding the amount of the constant hysteresis (for instance 10%) to the first set battery charge state SOC(L) is set as the second set battery charge state SOC(H) for the set of the hysteresis.

By this setting, the judgment of the HEV→EV mode change is carried out based on the second set battery charge state SOC(R) instead of the first set battery charge state SOC (L).

However, when the current mode is the HEV drive mode at step S152, or when the flag fENGREQ is 0 at step S153, that is, when it is judged that the request for the mode change from the EV drive mode to the HEV drive mode does not arise, the routine bypasses step S154, and the control is terminated as it is because the EV mode is continued, and there is no need to prepare for the judgment of the HEV→EV mode change. Then, the current flag fEVXX=0 is kept, and the state where the second set battery charge state SOC(H) is cleared is maintained.

Figure 8A:
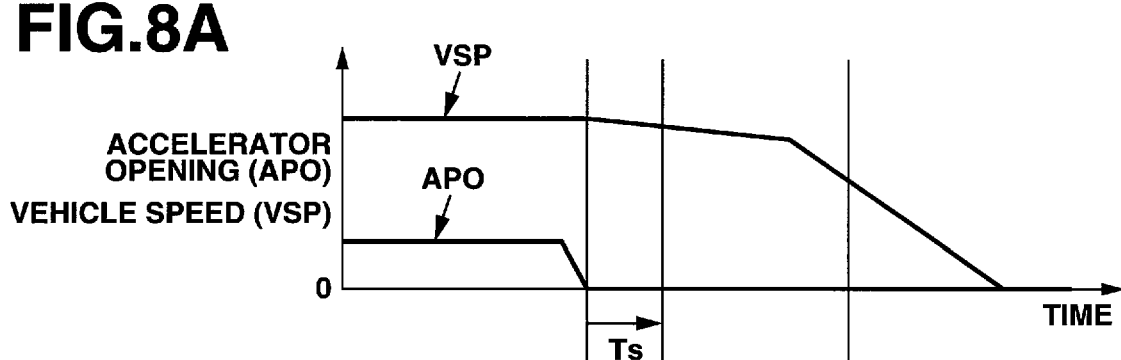
FIGS. 8A-8C are operation time charts of the mode change control by the control programs of FIGS. 2-4.
Figure 8B:
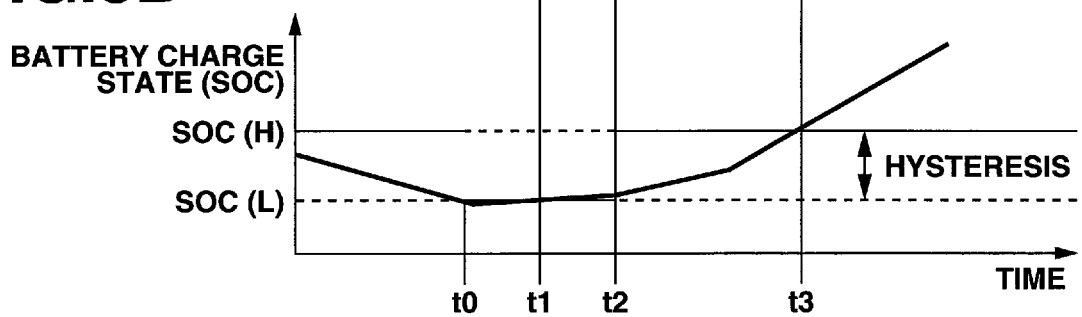
Figure 8C:
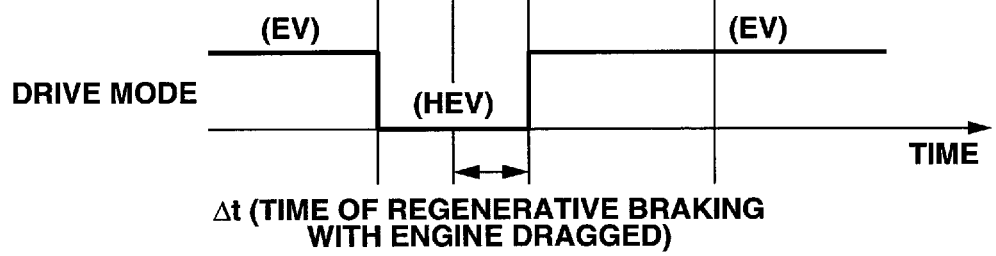

The process or operation of the above embodiment is explained below with reference to FIGS. 8A-8C, which show operation time charts. FIGS. 8A-8C are operation time charts of a case where, during the vehicle drive under the EV mode, the battery charge state SOC becomes smaller than the first set battery charge state 50C(L) at time t0. As a result, the mode change from the EV drive mode to the HEV drive mode is carried out. After time t1, it is desired that the vehicle speed VSP is lowered like the drawing in FIG. 8A, and the accelerator opening APO is kept at 0 by the release of the accelerator pedal. At time t3, the battery charge state SOC increases and becomes greater than or equal to the second set battery charge state SOC(R) by the HEV mode. Here, in order to recognize whether the second set battery charge state SOC (H) is set or not, the battery charge state is shown by a broken line in FIG. 8B. With these figures, it is possible to understand how the judgment of the mode change from the HEV drive mode to the EV drive mode is made based on the battery charge state.

According to the above embodiment, after time t1 of the release of the accelerator pedal, at time t2 at which the vehicle operating condition is judged to be the low load drive condition in which the motor/generator 1 performs the regenerative braking at steps S132-S135 in FIG. 3, the judgment of the HEV→EV mode change is carried out based on the first set battery charge state SOC(L) instead of the second set battery charge state SOC(R) by way of the clearance of the second set battery charge state SOC(H) by the performance of step S137 (fEVXX to 0). More precisely, the HEV→EV mode change is judged when the battery charge state SOC is higher than the first set battery charge state SOC(L) instead of comparing with the second set battery charge state SOC(H). As a result, the HEV→EV mode change is carried out at time t2 of the low load drive condition judgment, even though EV mode would not be permitted and HEV mode would be selected under the battery charge state SOC at time t2 if the second set battery charge state SOC(H) were not cleared. Time t2 is before time t3 at which the battery charge state SOC increases up to the second set battery charge state SOC(H).

Consequently, as is clear from the comparison with a comparative example shown in FIGS. 14A-14C and described hereinafter, it is possible to prevent a HEV mode coasting drive time Δt, which is a time of the regenerative braking with the engine dragged, from lengthening. An EV coasting drive time with no-engine drag can lengthened by the above-corresponding time. Therefore, the deterioration of the energy recovery performance caused by the regenerative braking with the engine dragged can be avoided, and the effect of improvement of fuel economy can be improved.

Figure 14A:
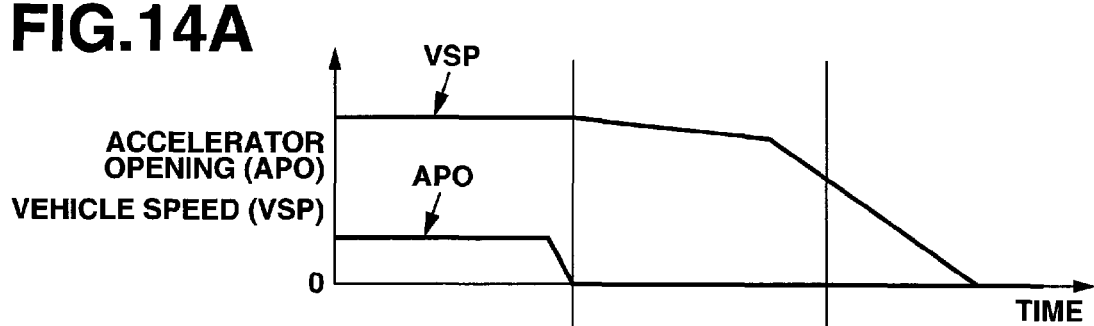
FIG. 14A-14C are operation time charts of the mode change control by the control programs of a comparative example.
Figure 14B:
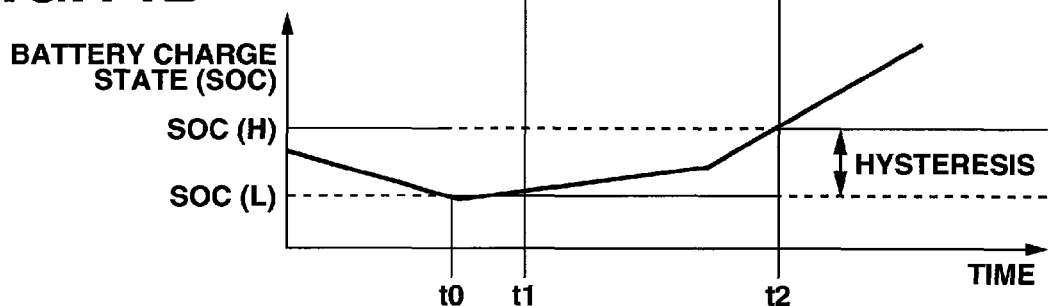
Figure 14C:
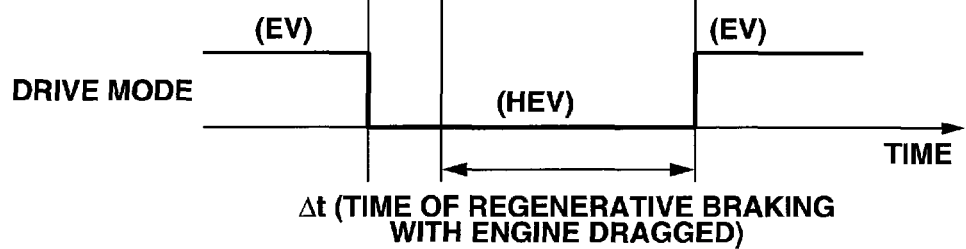

In contrast, an operation of the comparative example that does not use the control described herein is explained by use of time charts in FIGS. 14A-14C, which are operation time charts of a case where, during the drive of the EV mode a battery charge state SOC becomes lower than a first set battery charge state SOC(L) at time t0. As a result, the change from EV mode to the HEV mode is then carried out, and after time t1, an accelerator opening APO is kept at 0 by release of an accelerator pedal with a vehicle speed VSP desired to be lowered as shown in the drawing. By the HEV mode, the battery charge state SOC rises and becomes higher than or equal to a second set battery charge state SOC(R) at time t2 (corresponding to time t3 in FIG. 8). As a result, the change from HEV mode to the EV mode is then carried out.

According to this mode change control, there is a hysteresis area or domain between the first set battery charge state SOC(L) and the second set battery charge state SOC(H). The EV→HEV mode change is not carried out unless the battery charge state SOC becomes lower than the first set battery charge state SOC(L). Conversely, the HEV→EV mode change is not carried out unless the battery charge state SOC becomes higher than or equal to the second set battery charge state SOC(H). Thus, the hunting of the control can be prevented, preventing the frequent occurrence of the mode change between the electric drive (EV) mode and the hybrid drive (HEV) mode.

However, by the set of the above hysteresis, the battery charge state SOC becomes lower than the first set battery charge state SOC(L). Once the mode is changed from the EV drive mode to the HEV drive mode (at time t0), a return from the HEV drive mode to the EV drive mode is forbidden until time t2 at which the battery charge state SOC becomes higher than or equal to the second set battery charge state SOC(H). The following problems, therefore, arise.

The vehicle is coasting after the release of the accelerator pedal (t1), thus the motor/generator applies a braking force to the vehicle by regenerative braking while generating the electric power. The generated electric power obtained by this regenerative bralking is stored in the battery to use for the next motor drive.

Here, if the mode is the EV drive mode, the regenerative braking by the motor/generator is carried out without dragging the engine since the engine is separated from the motor/generator by release of the first clutch disposed between the engine and the motor/generator However, in the case of the HEV drive mode, the regenerative braking by the motor/generator is carried out under a condition where the engine is connected to the motor/generator by engagement of the first clutch, that is, the regenerative braking is carried out with dragging the engine. Then a regenerative braking energy is lowered by a energy of the engine drag. Thus, an energy recovery performance deteriorates, and improvement to fuel economy is restrained.

This point is explained with reference to the operation time charts in FIGS. 14A-14C, A HEV mode coasting drive time Δt from the time t1 of the release of the accelerator pedal to the time t2 of HEV→EV mode change corresponds to a time of the regenerative braking with the engine dragged. By the set of the above hysteresis, this HEV mode coasting drive time Δt lengthens. Accordingly, the energy recovery performance deteriorates and the effects of improvement to fuel economy are reduced.

In contrast, and according to the teachings herein, in the case where the selection of the EV drive mode is permitted even the battery charge state SOC where the HEV drive mode is selected under the low load drive condition in which the motor/generator 1 performs the regenerative braking, improvements in energy recovery and economy are attained by clearing the second set battery charge state SOC(H) and executing the judgment of the HEV→EV mode change on the basis of the first set battery charge state SOC(L). These improvements can be gained by control of the set/reset of the second set battery charge state SOC(H), and this has great advantages in cost and the simplicity of control.

Further, when judging the above low load drive condition, the low load drive condition is judged by the following drive conditions. First, the average accelerator opening APOave for the predetermined period from the time of the accelerator opening APO=0 is smaller than the minute set opening APOs, and the absolute value of the vehicle deceleration G during the above predetermined period is greater than or equal to the set deceleration "Gs", In addition, the low load drive condition is judged when the drive condition in which the accelerator opening APO is 0 has continued over the set time Ts. Consequently, the judgment of the low load drive condition in which the motor/generator 1 performs the regenerative braking can be made precisely and accurately, and the effects become reliable effects.

Furthermore, as shown in FIG. 7, the set time Ts can be set so that as the average accelerator opening APOave is greater, the set time Ts is longer, and as the absolute value of the vehicle deceleration G is greater, the set time Ts is shorter, Thus, regardless of an operation of the accelerator pedal, and regardless of an occurrence of the vehicle deceleration, the judgment of the low load drive condition in which the motor/generator 1 performs the regenerative braking, is carried out with accuracy. The effects then become reliable effects.

In certain embodiments, it is desirable that the set deceleration Gs is set so that as a power consumption of auxiliary drive machinery of the battery other than the motor/generator is greater, the set deceleration Gs is greater. In a case where the auxiliary drive machinery power consumption of the battery is great, securing the battery power for the EV drive often becomes difficult. However, in such a case, if the set deceleration Gs for the coasting drive judgment is set to be great as described above, the judgment of the low load drive becomes strict or hard, and it reduces the tendency to change the drive mode to the EV drive mode. As a result, the hunting of the mode change, which is associated with the engine start and stop, can be prevented. Also, the effects of improvement to fuel economy can be improved or gained.

In addition, with respect to the set time Ts in certain embodiments, it is desirable that the set time Ts is set so that as the power consumption of auxiliary drive machinery of the battery other than the motor/generator is greater, the set time Ts is longer. In the case where the auxiliary drive machinery power consumption of the battery is great, securing the battery power for the EV drive often becomes difficult. However, in such a case, if the set time Ts is set to be long as described above, the judgment of the low load drive becomes strict or hard, and it reduces the tendency to change the drive mode to the EV drive mode. As a result, the hunting of the mode change, which is associated with the engine start and stop, can be prevented. Also, the effects of improvement to fuel economy can be improved or gained.

Furthermore, in a case where the vehicle speed VSP is smaller than the set vehicle speed, the same control as the case of the low load drive condition in which the motor/generator 1 performs the regenerative braking can be performed, and the selection of the EV drive mode is permitted by the clearance of the second set battery charge state SOC(H). During the low speed drive in the HEV drive mode with use of the engine 2, a condition in which the first clutch 6 or the second clutch 7 is in a slipped state is needed in order to absorb torque change or fluctuation of the engine. However, in the EV drive mode in which the engine is disconnected there is no need to put the first clutch 6 or the second clutch 7 in the slipped state even at the low speed condition since only the power from the motor/generator 1 is used. In the case where the same control as the case of the low load drive condition is carried out at the low speed condition and the selection of the EV drive mode is permitted by the clearance of the second set battery charge state SOC(H) as described above, a clutch slip control is not needed. This thereby avoids the deterioration of the fuel economy due to the clutch slip.

The above embodiment describes a case where, when the low load drive condition of the vehicle in which the regenerative braking is performed under the battery charge state where the hybrid drive mode is selected is carried out, the second set battery charge state SOC(H) that is set as a base or reference value of the mode change from the hybrid drive mode to the electric drive mode is not set or is cleared. With this, the time for which the engine is dragged is shortened when performing the regenerative braking by the motor/generator; and the energy recovery performance is improved. However, the present invention is not limited to this embodiment in which the second set battery charge state is not set or is cleared. That is, the second set battery charge state can be changed to a lower value than an initial value, and the judgment of the mode change from the hybrid drive mode to the electric drive mode can be made based on this changed lower value. Further, the mode change to the electric drive mode can be permitted even under the battery charge state where the hybrid drive mode would be selected if the second set battery charge state were not changed to a lower value.

In the above embodiment, the second set battery charge state is not set or is cleared, and the judgment of the mode change from the hybrid drive mode to the electric drive mode is made based on the first set battery charge state. Thus, the mode change to the electric drive mode is permitted even under the battery charge state where the hybrid drive mode has to be selected. This is an embodiment in which an initial value of the second set battery charge state is changed and lowered to the first set battery charge state until this initial value becomes the same value as the first set battery charge state. Based on this first set battery charge state, the judgment of the mode change from the hybrid drive mode to the electric drive mode is made. That is to say, it can be understood that the above embodiment explained wherein the second set battery charge state is not set or is cleared is an embodiment in which the second set battery charge state is changed to a value lower than the initial value (that is, the lower value can be the first set battery charge state).

Next, another embodiment is explained below with reference to FIGS. 9-13C. In this embodiment, the second set battery charge state (the reference or base value) is not cleared like the above embodiment. Instead, second set battery charge state is changed to a value lower than the initial value (that is, to an effective value that is not zero). Based on this changed value, the mode change control from the hybrid drive mode to the electric drive mode is carried out.

Since the power train or configuration of the mode change control system applied to the hybrid vehicle is the same as the above embodiment, an explanation will be made with use of FIG. 1 to the extent necessary. Further, only differences from the embodiment illustrated with respect to FIGS. 2-4, 6 and 8 are described with reference to FIGS. 9-13C.

Figure 9:
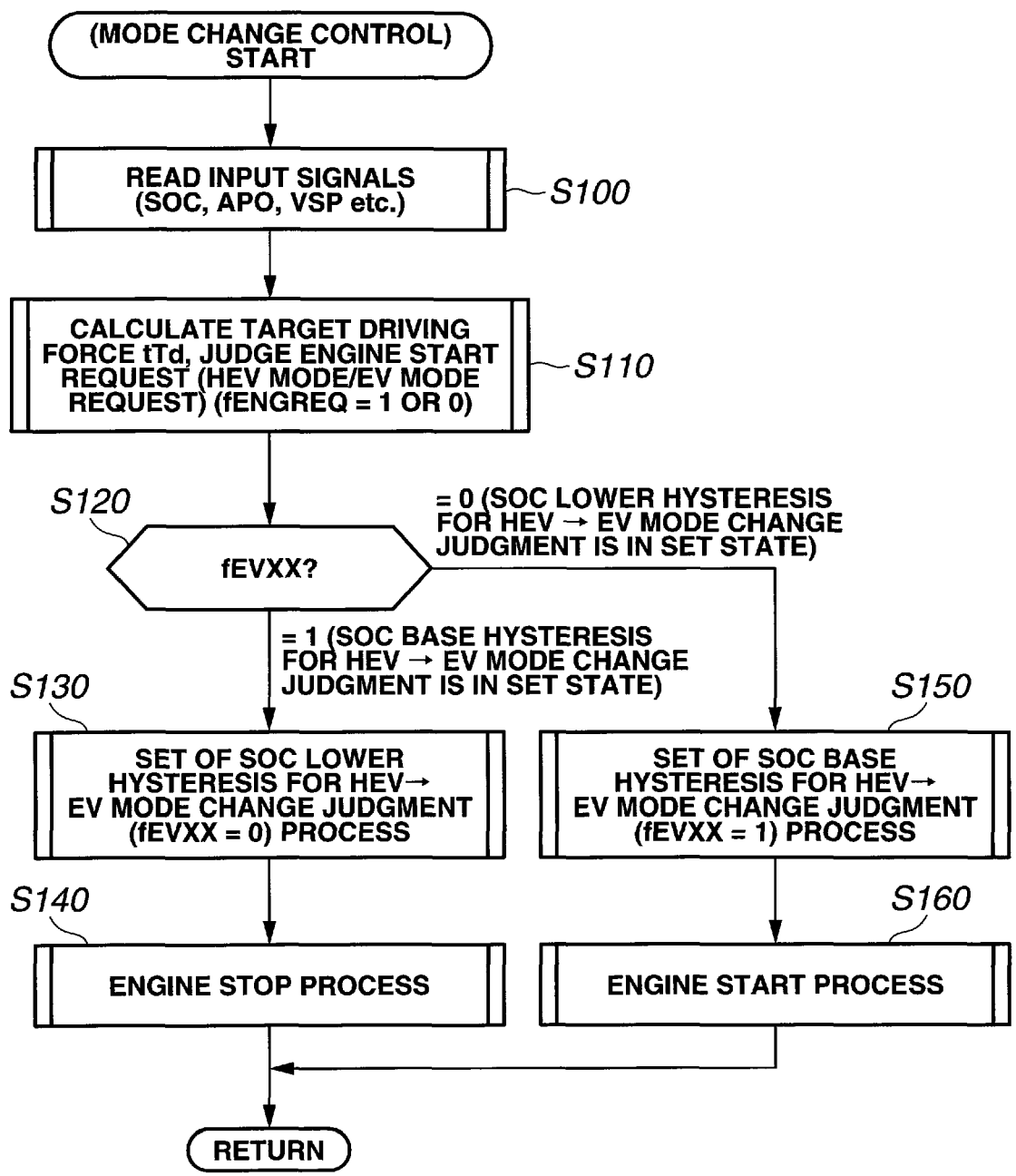
FIG. 9 is a flow chart showing a control program of the mode change control according to another embodiment of the invention.

FIG. 9 is a drawing, similar to FIG. 2, showing a flow chart of a main control program of the mode change control that the integrated controller 20 executes. Processes up to step S110 are the same as the above embodiment, but a process of check of the flag fEVXX at step S120 is different from that of the above embodiment. Here, when a SOC base hysteresis for the HEV→EV mode change judgment between the first set battery charge state SOC(L) and the second set battery charge state SOC(H) is set, the flag fEVXX is set to 1. When a SOC lower hysteresis for the HEV→EV mode change judgment is set, the flag fEVXX is set to 0.

Figure 12:
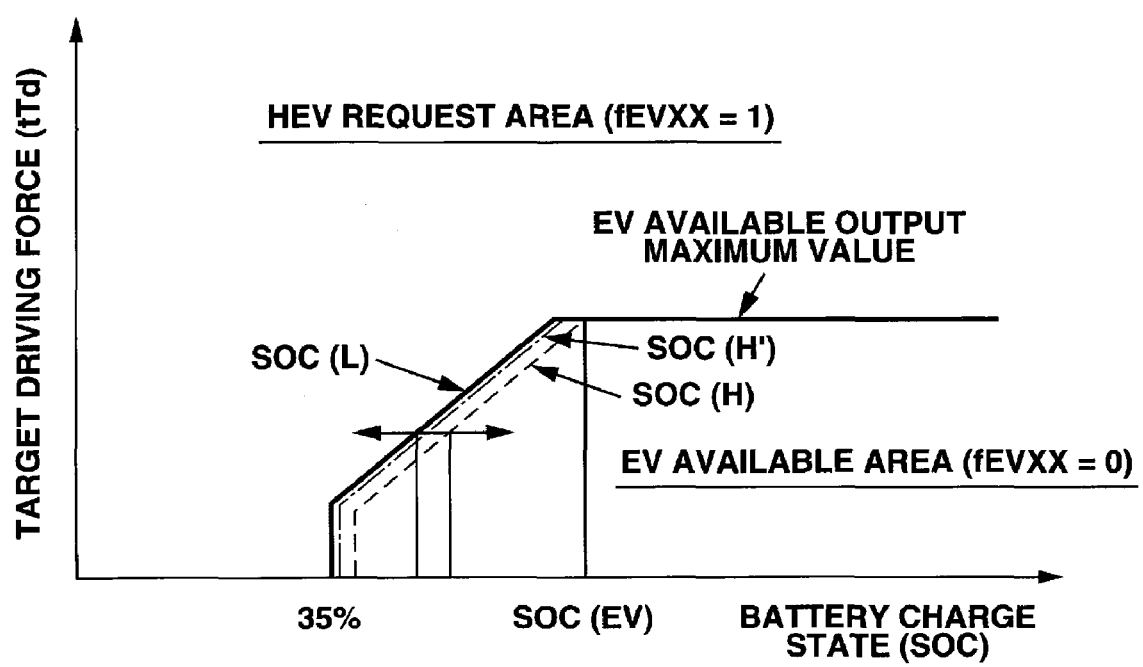
FIG. 12 is a characteristic line showing an available output maximum value in the EV mode that can be used for judging whether the target driving force is a value of an EV mode-capable area or a value of a HEV mode-request area (a first set battery charge state used for judging of EV→HEV mode change), and also showing a second set battery charge state used for judging of HEV→EV mode change, according to another embodiment.

In this embodiment, the second set battery charge state SOC(H) is not cleared, but a battery charge state SOC(H') set by lowering (diminishing) the value of the second set battery charge state SOC(H) is newly set. As shown in FIG. 12, as compared with the base hysteresis area formed between the first set battery charge state SOC(L) and the initial second set battery charge state SOC(H), a narrow hysteresis area (lower hysteresis) that is formed by the first set battery charge state SOC(L) and the lower second battery charge state SOC(H') is set, That is, as shown in FIG. 12, in the case where the second set battery charge state SOC(H) is set as a value that is greater by the amount of the constant hysteresis (for instance 10%), this second set battery charge state is set again to a value that is greater than the first set battery charge state SOC(L) by an amount of the constant hysteresis (for instance 3%) as SOC (H'). In other words, the second set battery charge state that defines the initial SOC(H), is changed to SOC(H'), which is smaller than the initial value of SOC(H). By this change, small value second set battery charge state SOC(H') and the first set battery charge state SOC(L), the lower hysteresis is set.

Figure 10:
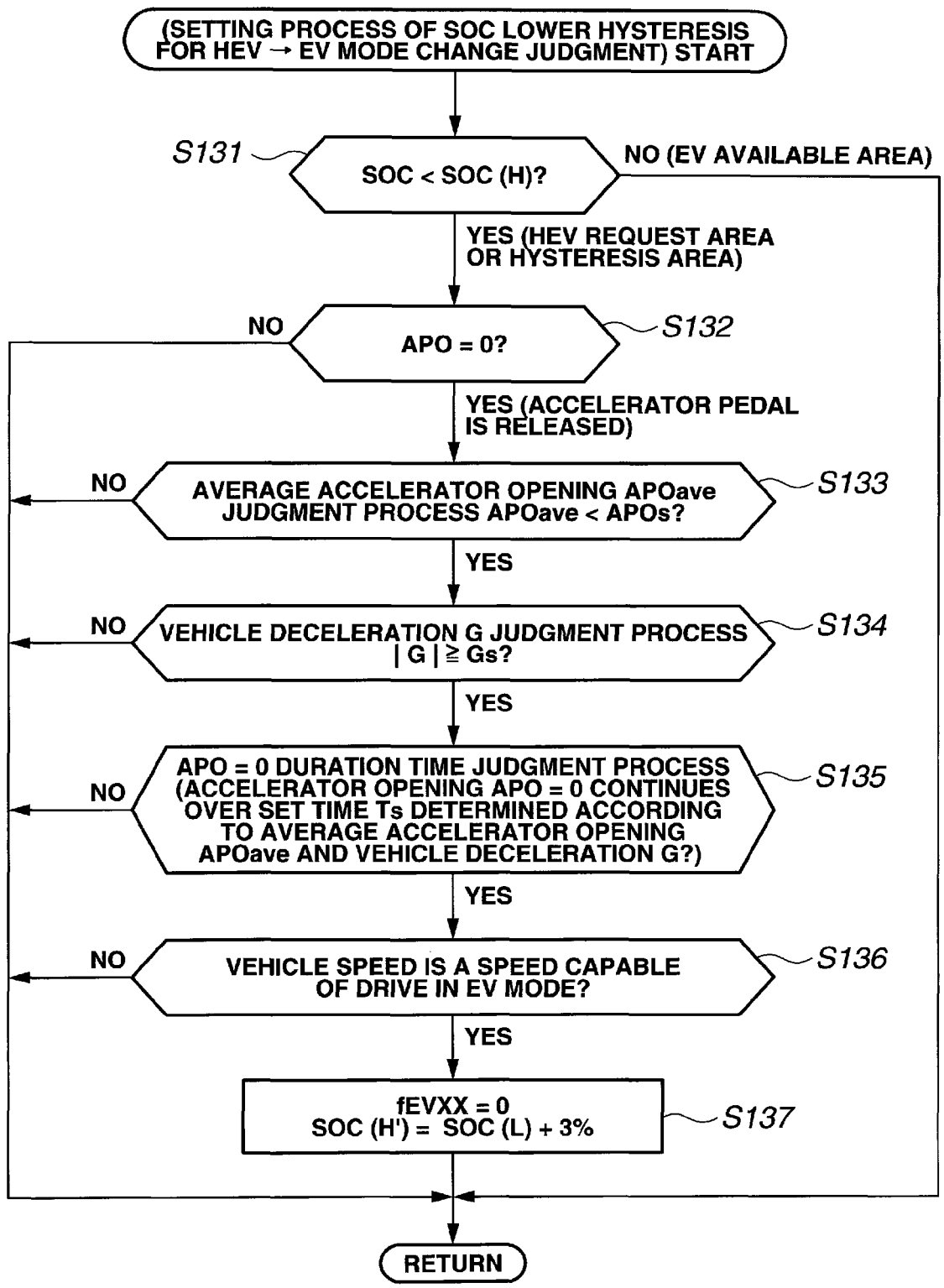
FIG. 10 is a flow chart showing a control program concerning a setting process of SOC lower hysteresis for a HEV→EV judgment in FIG. 9.

In a case where the flag fEVXX=1 at step S120 in FIG. 9, the SOC base hysteresis for the HEV→EV mode change judgment is set. Then the routine proceeds to steps S130 and S140. At step S130, the control program shown in FIG. 10 is executed. If the request for the lower hysteresis arises, in order to change the SOC base hysteresis for the HEV→EV mode change judgment to the lower hysteresis, processes that change the flag fEVXX to 0 are executed. These processes as shown in FIG. 10 are the same as those explained in FIG. 3 except that the lower hysteresis is set at the last step S137.

Figure 11:
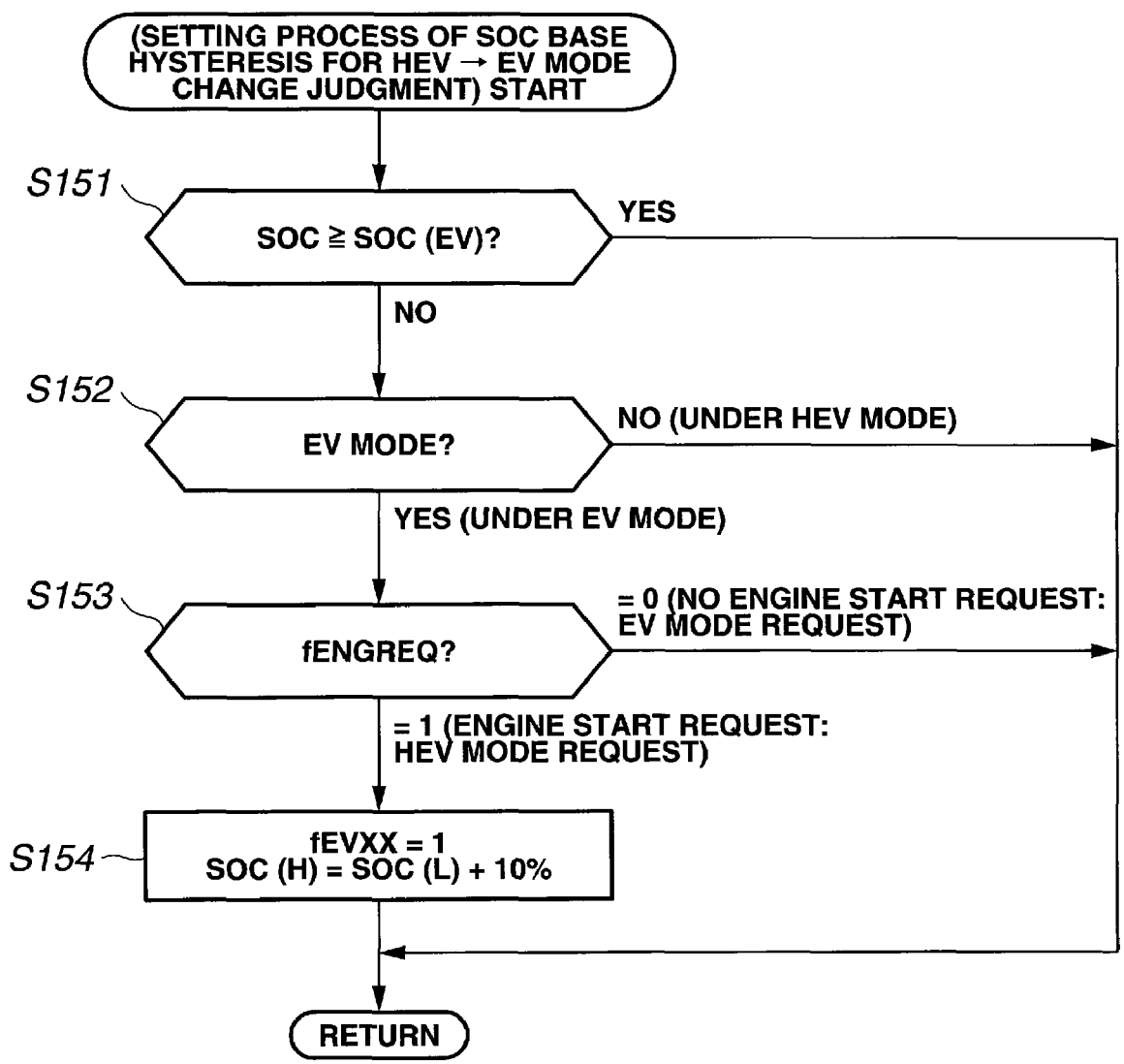
FIG. 11 is a flow chart showing a control program concerning a setting process of SOC base hysteresis for a HEV→EV judgment in FIG. 9.

On the other hand, in a case where the flag fEVXX=0 at step S120 of FIG. 9, wer hysteresis for the HEV→EV mode change judgment is set. Then the routine proceeds to steps S150 and S160. At step S150, the control program shown in FIG. 11 is executed. If the request for the base hysteresis arises, in order to change the SOC lower hysteresis for the HEV→EV mode change judgment to the base hysteresis, processes that change the flag fEVXX to 1 are executed. These processes, shown in FIG. 11, are same as those explained in FIG. 4.

Figure 13A:
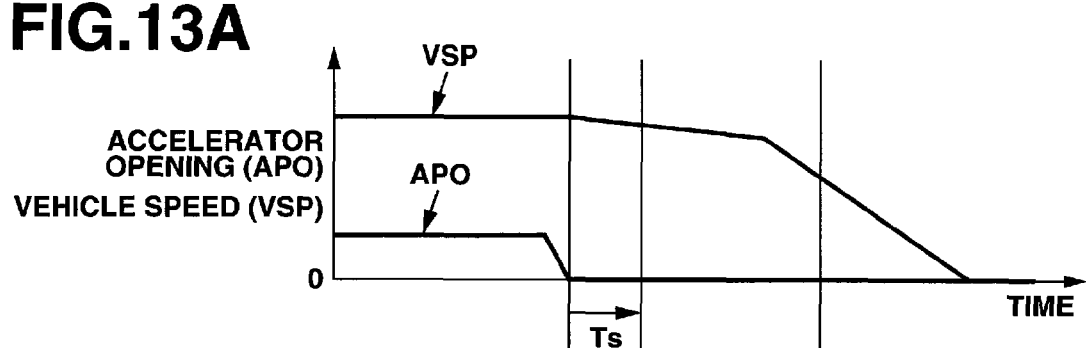
FIG. 13A-13C are operation time charts of the mode change control by the control programs of FIGS. 9-11.
Figure 13B:
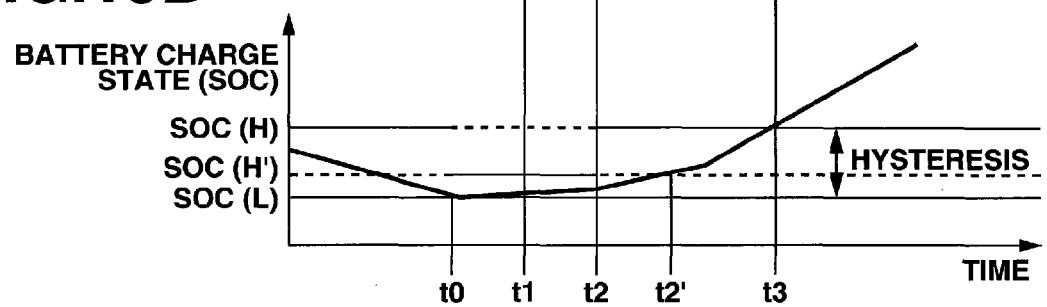
Figure 13C:
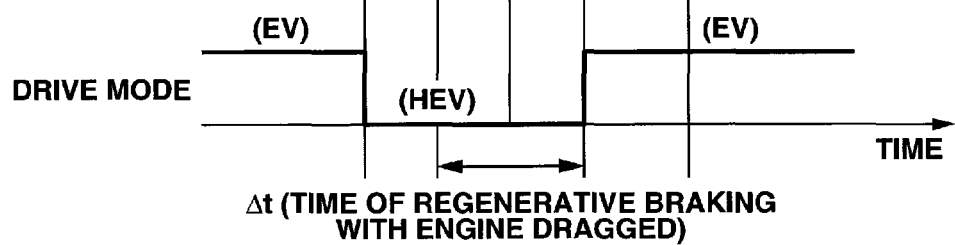

FIGS. 13A to 13C are operation time charts of the mode change control, which result in the same operation as that shown in FIGS. 8A-8C. FIGS. 13A to 13C show a case where, during the vehicle drive under the EV mode, the battery charge state SOC becomes smaller than the first set battery charge state SOC(L) at time t0. As a result, the mode change from the EV drive mode to the HEV drive mode is carried out. After time t1, it is desired that the vehicle speed VSP is lowered like the drawing in FIG. 13A, and the accelerator opening APO is kept at 0 by the release of the accelerator pedal. At time t2', the battery charge state SOC increases and becomes greater than or equal to the second set battery charge state SOC(H') by the HEV mode.

According to this embodiment, after time t1 of the release of the accelerator pedal, at time t2' at which the vehicle operating condition is judged to be the low load drive condition in which the motor/generator 1 performs the regenerative braking at steps S132-S135 in FIG. 10, the HEV→EV mode change is carried out at time t2' of the low load drive condition judgment. This is before time t3 at which the battery charge state SOC increases up to the second set battery charge state SOC(H). This mode change is carried out later than the first embodiment of the time t2. However, as compared with the conventional example shown in FIGS. 14A-14C, the HEV mode coasting drive time, which is the time of the regenerative braking with the engine dragged, can be shortened. Hence, the effects of improvement to fuel economy can be improved or gained, same as the case of the first embodiment.

The above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A control system of a hybrid vehicle including an engine, a motor/generator, a battery operable to provide the motor/generator with electric power and to receive and store electric power regenerated by the motor/generator, a first clutch disposed between the engine and the motor/generator, and at least one driving wheel, the control system comprising:
   a controller configured to:
     select a drive mode wherein the drive mode comprises at least one of an electric drive mode, in which the first clutch is released and power transmission is made only between the motor/generator and the at least one driving wheel, and a hybrid drive mode, in which the first clutch is engaged and power transmission is made between at least the engine and the motor/generator and the at least one driving wheel, wherein the hybrid drive mode is selected by initiating a mode change from the electric drive mode to the hybrid drive mode when a battery charge state of the battery becomes lower than a first set battery charge state and wherein the electric drive mode is selected by initiating a mode change from the hybrid drive mode to the electric drive mode when the battery charge state becomes higher than or equal to a second set battery charge state, wherein an initial value of the second set battery charge state is higher than the first set battery charge state;

determine a vehicle driving condition when the battery charge state of the battery becomes lower than the second set battery charge state; and reduce the second set battery charge state to a lower value than the initial value when the vehicle driving condition is judged to be a low load drive condition in which a regenerative braking is carried out under the battery charge state during the hybrid drive mode such that the electric drive mode is selected, initiating the mode change from the hybrid drive mode to the electric drive mode at the lower value of the second set battery charge state.

2. The control system according to claim 1 wherein the lower value is a same value as the first set battery charge state; and wherein the controller is further configured to decide to make the mode change from the hybrid drive mode to the electric drive mode based on the first set battery charge state during the low load drive condition of the vehicle.

3. The control system according to claim 2, wherein the controller is further configured to reset the second set battery charge state to the initial value when changing the drive mode from the electric drive mode to the hybrid drive mode and to select the electric drive mode based on the second set battery charge as reset.

4. The control system according to claim 1 wherein the low load drive condition is a drive condition in which an average accelerator opening for a predetermined period from a time at which an accelerator opening of the engine becomes 0 is smaller than a set accelerator opening and in which a vehicle deceleration during the predetermined period is greater than or equal to a set deceleration.

5. The control system according to claim 4 wherein the controller is further configured to conclude the low load drive condition exists when the accelerator opening is 0 over a set time.

6. The control system according to claim 5 wherein the controller is further configured to set the set time such that the set time is lengthened as the average accelerator opening increases.

7. The control system according to claim 5 wherein the controller is further configured to set the set time such that the set time is shortened as the vehicle deceleration increases.

8. The control system according to claim 1 wherein the controller is further configured to permit selection of the electric drive mode even when a vehicle speed is a low speed that is smaller than a set vehicle speed.

9. The control system according to claim 1 wherein the hybrid vehicle further includes a second clutch disposed between the motor/generator and the at least one driving wheel; and wherein the controller of the control system is further configured to start the engine by engaging the first clutch and transmitting a torque of the motor/generator to the engine when the mode change from the electric drive mode to the hybrid drive mode is made.

10. A controller for a hybrid vehicle including an engine, a motor/generator, a battery operable to provide the motor/generator with electric power and to receive and store electric power regenerated by the motor/generator, a first clutch disposed between the engine and the motor/generator, and at least one driving wheel, the controller comprising:

means for selecting a drive mode wherein the drive mode comprises at least one of an electric drive mode, in which the first clutch is released and power transmission is made only between the motor/generator and the at least one driving wheel, and a hybrid drive mode, in which the first clutch is engaged and power transmission is made between at least the engine and the motor/generator and the at least one driving wheel, wherein the selecting means includes:

means for initiating a mode change from the electric drive mode to the hybrid drive mode when a battery charge state of the battery becomes lower than a first set battery charge state; and means for initiating a mode change from the hybrid drive mode to the electric drive mode when the battery charge state becomes higher than or equal to a second set battery charge state, wherein an initial value of the second set battery charge state is higher than the first set battery charge state;

means for determining a vehicle driving condition when the battery charge state of the battery becomes lower than the second set battery charge state; and means for reducing the second set battery charge state to a lower value than the initial value when the vehicle driving condition is judged to be a low load drive condition in which a regenerative braking is carried out under the battery charge state during the hybrid drive mode such that the means for selecting a drive mode selects the electric drive mode, initiating a mode change from the hybrid drive mode to the electric drive mode at the lower value of the second set battery charge state.

11. A control method of a hybrid vehicle including an engine, a motor/generator, a battery operable to provide the motor/generator with electric power and to receive and store electric power regenerated by the motor/generator, a first clutch disposed between the engine and the motor/generator, and at least one driving wheel, the control method comprising:

selecting a drive mode wherein the drive mode comprises at least one of an electric drive mode, in which the first clutch is released and power transmission is made only between the motor/generator and the at least one driving wheel, and a hybrid drive mode, in which the first clutch is engaged and power transmission is made between at least the engine and the motor/generator and the at least one driving wheel, wherein selecting the drive mode includes:

deciding to make a mode change from the electric drive mode to the hybrid drive mode when a battery charge state of the battery becomes lower than a first set battery charge state; and deciding to make a mode change from the hybrid drive mode to the electric drive mode when the battery charge state becomes higher than or equal to a second set battery charge state, wherein an initial value of the second set battery charge state is higher than the first set battery charge state;

determining a vehicle driving condition when the battery charge state of the battery become lower than the second set battery charge state;

reducing the second set battery charge state to a lower value than the initial value when the vehicle driving condition is judged to be a low load drive condition in which a regenerative braking is carried out under the battery charge state during the hybrid drive mode; and deciding to make the mode change to the electric drive mode from the hybrid drive mode based on the lower value of the second set battery charge state when the vehicle driving condition is judged to be the low load drive condition.

12. The control method according to claim 11 wherein the lower value is a same value as the first set battery charge state such that deciding to make the mode change from the hybrid drive mode to the electric drive mode is based on the first set battery charge state when the vehicle driving condition is judged to be the low load drive condition.

13. The control method according to claim 11, further comprising:

resetting the second set battery charge state to the initial value when changing the drive mode from the electric drive mode to the hybrid drive mode.

14. The control method according to claim 11 wherein the low load drive condition is a drive condition in which an average accelerator opening for a predetermined period from a time at which an accelerator opening of the engine becomes 0 is smaller than a set accelerator opening and in which a vehicle deceleration during the predetermined period is greater than or equal to a set deceleration.

15. The control method according to claim 14, further comprising:

concluding the low load drive condition exists when the accelerator opening is 0 over a set time.

16. The control method according to claim 15, further comprising:

lengthening the set time as the average accelerator opening increases.

17. The control method according to claim 15, further comprising:

shortening the set time as the vehicle deceleration increases.

18. The control method according to claim 11, further comprising:

permitting selection of the electric drive mode even when a vehicle speed is a low speed that is smaller than a set vehicle speed.

* * * * *